Oct. 25, 1932.  B. W. DUNHAM  1,884,631
PREPARATION OF BLOOMS FOR ROLLING
Filed May 31, 1929   6 Sheets-Sheet 3

Oct. 25, 1932.   B. W. DUNHAM   1,884,631
PREPARATION OF BLOOMS FOR ROLLING
Filed May 31, 1929   6 Sheets-Sheet 5

Inventor:
Byron W. Dunham
John C. Carpenter
Atty.

Patented Oct. 25, 1932

1,884,631

UNITED STATES PATENT OFFICE

BYRON W. DUNHAM, OF OAKMONT, PENNSYLVANIA, ASSIGNOR TO EDGEWATER STEEL COMPANY, OF PITTSBURGH, PENNSYLVANIA, A CORPORATION OF PENNSYLVANIA

PREPARATION OF BLOOMS FOR ROLLING

Application filed May 31, 1929. Serial No. 367,290.

This invention relates in general to the manufacture of rolled, annular, metal objects, and has more particular reference to the preparation of the bloom preparatory for the rolling operation in the rolling mill.

The rolling of an annulus from steel or other metal is usually preceded by the formation of a bloom containing the desired amount of metal of much smaller diameter than that of the finished product. Blooms of this sort have in the past been formed by upsetting a block of metal of the desired volume, and as an incident to the upsetting operation a central or substantially central opening has been provided.

This invention contemplates the provision of blooms of this character by an improved process and through the employment of improved apparatus.

The principal object of the invention, generally stated, is the provision of blooms to be employed for the rolling of annular metal objects, of more accurate dimension, and at increased rate of production.

The invention has for a further object the provision of an improved process which may be rapidly and efficiently practiced and which will result in the production of uniformly, accurately shaped and dimensioned blooms.

A further object of the invention is the provision of a new and improved apparatus for the production of blooms to be used for the purpose above set forth, which will have a high rate of production and which will produce blooms of accurate and uniform shape and dimension.

Another important object of the invention is the provision of an apparatus of the character described which, while having desired power and capacity, will be capable of relatively high speed operation and which will include in its organization mechanism and devices arranged to simultaneously operate upon successive blooms in process of formation.

Another important object of the invention is the provision of an apparatus of the class described made up of simple and sturdy parts unlikely to require frequent repair, readjustment and/or replacement.

Numerous other objects and advantages of the invention will be apparent from the following description, which, when taken in connection with the accompanying drawings, discloses a preferred embodiment thereof.

Referring to the drawings.

For the purpose of illustrating my invention, I have shown on the drawings an apparatus adapted for the practice of my improved process and embodying the apparatus features of the invention. It comprises a frame or bed plate 21 upon which the operative parts are mounted and from which standards 22 extend up to support an overhead press framework in which a press head generally indicated by reference character 24 is caused to reciprocate vertically and with the desired power as will be readily understood.

Side guides 25 are mounted upon the press bed 21 and a slide 26 is arranged to reciprocate in the guides 25, being moved in its reciprocation by a fluid pressure cylinder 26', the piston of which (not shown) is connected through its piston rod 27 with the slide at 28. The slide 26 is provided with an upsetting anvil 29 and a piercing and expanding punch, generally indicated at 31. In the reciprocation of the slide the anvil 29 and the punch 31 are alternately arrangeable beneath an active press head member or top anvil 32.

Four posts 43 extend up from the bed plate of the press or apparatus and a framework comprising end members 44 and slide shafts 45 is arranged for vertical reciprocation thereon. The end members 44 are provided with bosses 46 embracing the posts 43 and rest upon springs 47 arranged about posts and between the bosses 46 and bracket bosses 48 carried on the bed plate. Above the frame collars 49 are positioned on the posts 43 to limit upward movement of the frame under pressure of the springs 47.

A die or ring carrier 51, having integral pierced lugs or bosses 52, is arranged to slide longitudinally on the shafts 45, these bosses having free sliding engagement upon these shafts.

Figure 4:
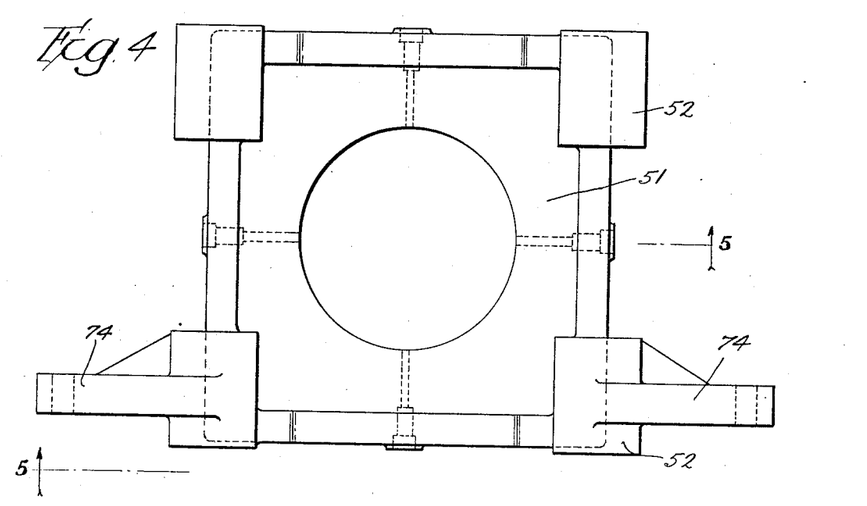
Fig. 4 is a top plan view of the confining ring or die carrier to be presently described.
Figure 5:
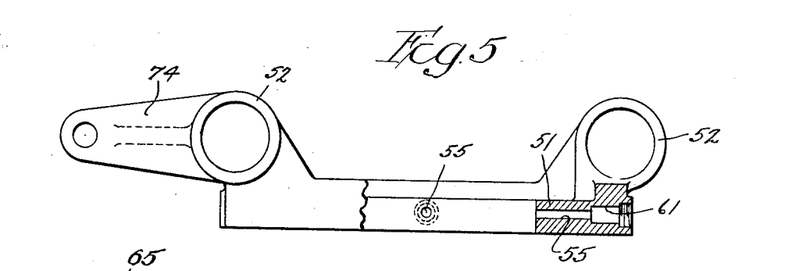
Fig. 5 is a section taken substantially on the broken line 5—5 of Fig. 4.
Figure 6:
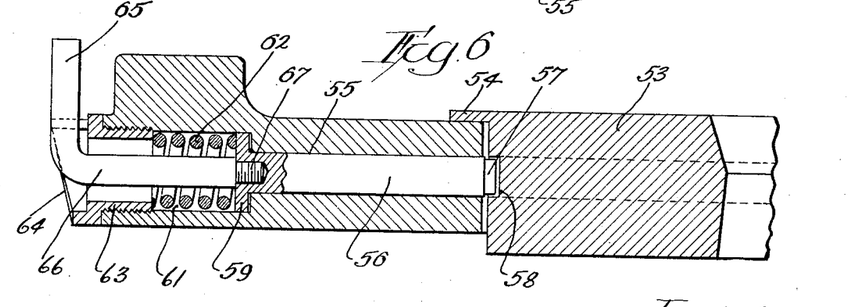
Fig. 6 is an enlarged detailed section, showing the mounting of the confining ring or die in the carrier of Fig. 4.

The carrier 51 is provided with a large circular internal opening and a die or ring 53 is arranged in said opening, said die or ring having a peripheral flange 54 adapted to overlie and rest upon the upper face of the carrier about its opening. The external circumference of the die or ring 53 is somewhat smaller than the presented circumference of the opening. A plurality of centering devices, more particularly shown in Figs. 4 and 6, are provided to normally hold the die or ring 53 in central position in the opening. The carrier is pierced at 55 to receive radially arranged pins 56 which extend into the opening and have ends 57 which engage in a groove 58 provided for the purpose in the outer peripheral face of the die or ring 53.

Each pin 56 is provided with an enlarged head 59 which is arranged within an enlarged part 61 of the bore or piercing 55. A spring 62 is positioned in the enlargement 61 of the bore or piercing and between the enlarged head 59 of the pin 56 and a hollow collar 63 threadedly engaged in the enlargement 61. The collar 63 is provided at its outer end with a cam 64. This cam is engaged by a laterally extending arm 65 of a retracting member 66 which extends through the collar 63, the spring 62, and into engagement at 67 with the pin. It will be understood that rotation of the arm 65 forwardly from the position shown in Fig. 6 will cause the pin to be withdrawn from engagement with the ring or die 53 as the arm 65 is forced outwardly by the cam in the rotative movement. This construction permits of retraction of the pins for removal of the die or ring 53.

Figure 1:
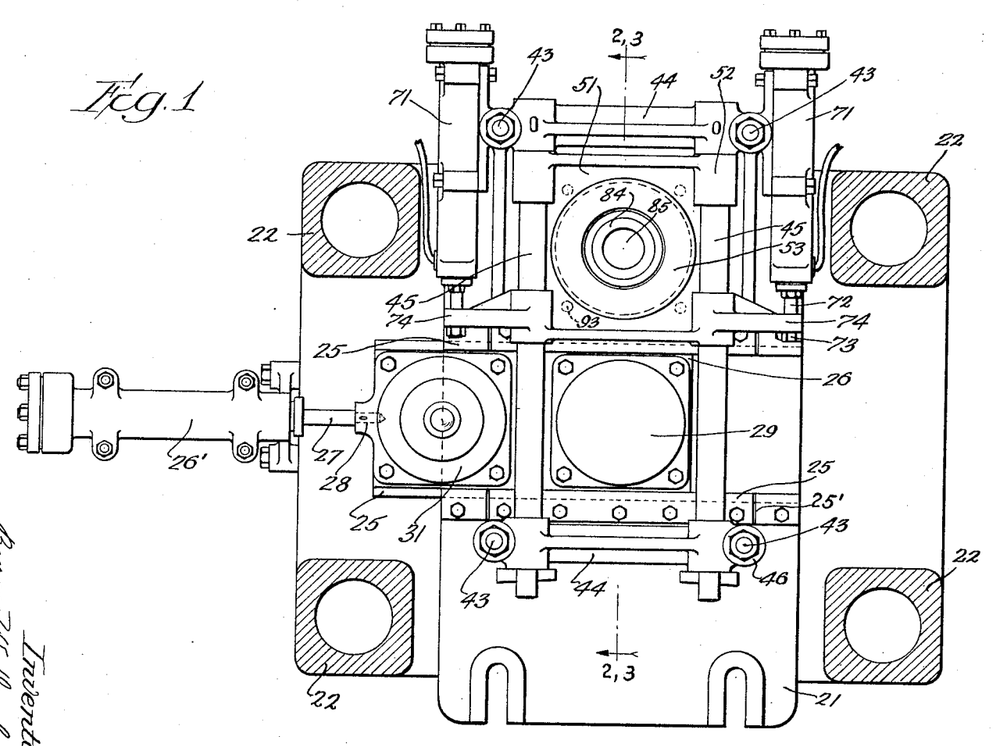
Figure 1 is a top plan view of the operative parts of an apparatus embodying my invention, portions of the frame being shown in section.

Two fluid pressure cylinders 71 are provided to reciprocate the carrier 51 on the shafts 45 in the operation of the apparatus, these cylinders having their piston rods 72 connected at 73 to outwardly extending lugs 74 of the carrier. It will be noted that the movement of the carrier 51 is at right angles to the movement of the slide 26, and that the carrier is adapted to be placed in axial registration with the punch 31 when the two have been conjointly moved into registration with the position occupied by the anvil 29 in Fig. 1.

The press head 24 carries a punch or piercing male die or member 81 secured at 82 to a block 83 carried by the press head. The punch 81 is arranged in axial registration with the carrier 51 when the carrier has been moved to the position shown in Fig. 1 of the drawings, and in which position it is away from the position of the anvil 29.

A member 84 is mounted upon the press bed in axial registration with the punch 81 and the member 84 is provided with an opening 85 into which the punch 81 may move in its reciprocation. An opening 86 through the press bed communicates with the opening 85 for a purpose to be presently described.

Figure 7:
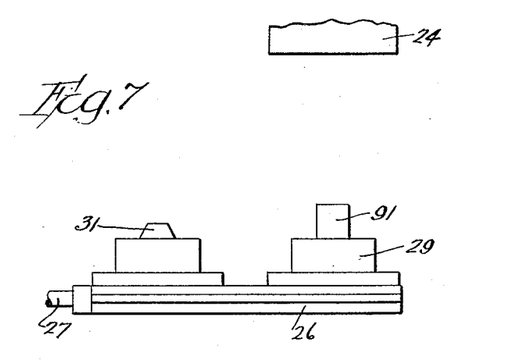
Figs. 7 and 8 are schematic views illustrating respectively the initial position of a block to be formed into a bloom and the first upsetting operation.
Figure 8:
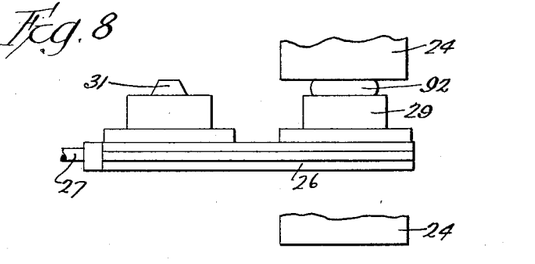
Figure 9:
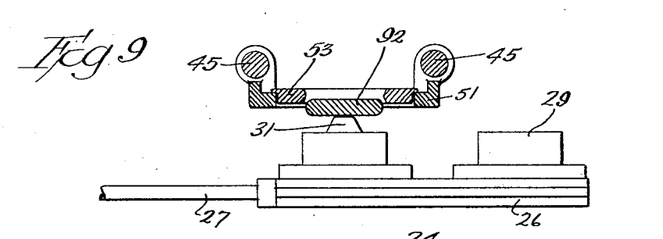
Fig. 9 is a view similar to Figs. 7 and 8, the die carrier, the die and the bloom being shown in section and arranged for the initial piercing operation and the sizing of the bloom in the die.
Figure 10:
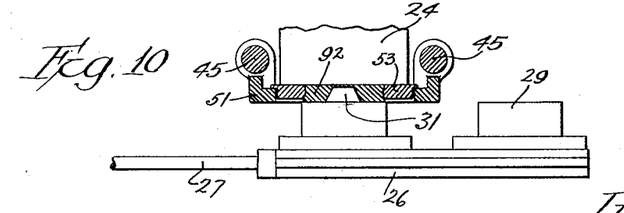
Fig. 10 is a view similar to Fig. 9 and showing the arrangement of the parts after this operation.
Figure 11:
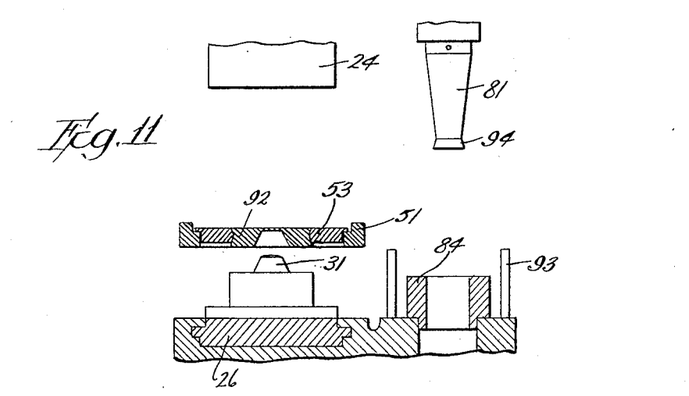
Figs. 11, 12 and 13 are sectional views, the parts being shown somewhat schematically to illustrate the subsequent operations of the apparatus to the completed bloom.

My invention contemplates the upsetting of a block of metal and its formation into a bloom, preferably following the steps generally illustrated progressively in Figs. 7 to 13. Referring to Fig. 7, the block 91 containing the desired amount of metal is positioned upon the anvil 29, the anvil at this time being located beneath the upper active press member 24. The press member or top anvil 24 moves down in the reciprocation of the press compressing the block to the general bloom form indicated at 92 in Fig. 8. After the member 24 has moved on its up-stroke, the carrier 51 and the slide 26 are moved into axial registration with the top anvil 24, their relative positions after this movement being shown in Fig. 9.

Figure 2:
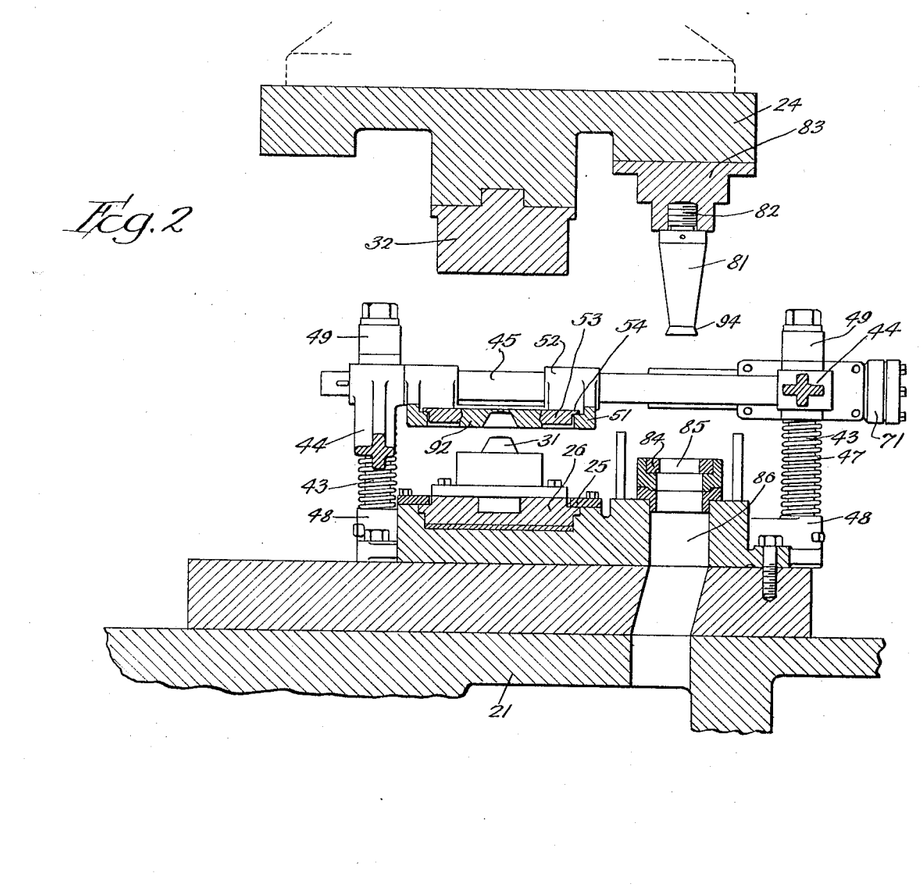
Figs. 2 and 3 are sections taken upon the line 2, 3,—2, 3 of Fig. 1, and showing the parts in two of the positions they assume in the operation of the apparatus.
Figure 3:
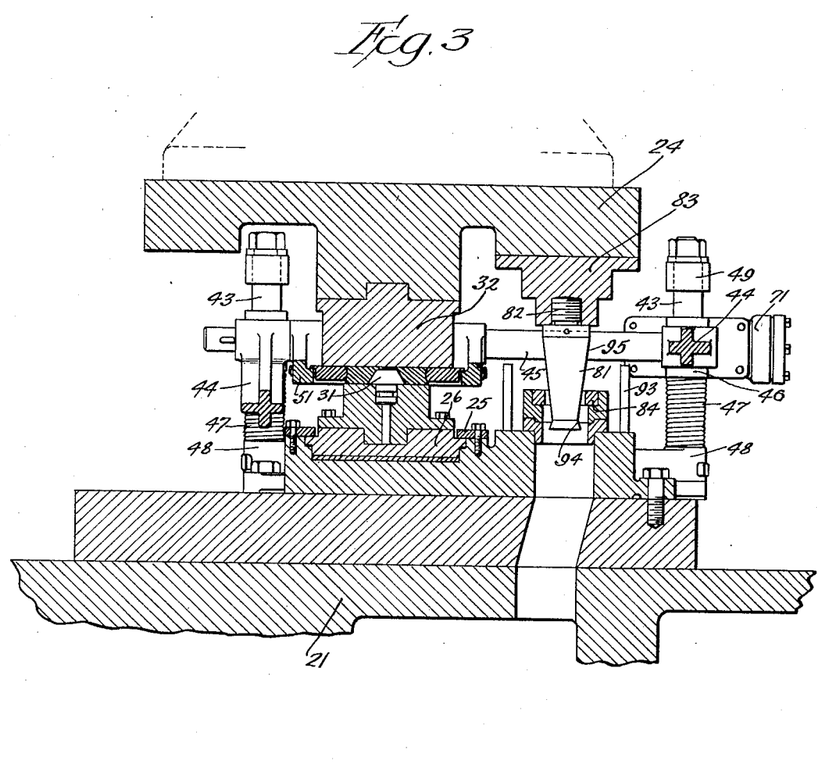

The dimensions of the block 91 are such that after the compression into the bloom form shown at 92 in Fig. 2, it may be lifted from the anvil 29 and dropped through the die or ring member 53 onto the punch or expander 31, as illustrated in this figure. This may be accomplished by the operator lifting the bloom with a pair of tongs and dropping it through the die or ring member 53. The arrangement is preferably such that the carrier at this stage of the process arranges the die or ring 53 slightly above the top of the punch 31, this arrangement being accomplished by the provision of collars of appropriate length on the tops of the posts 43, as already described. At the next downward movement of the top anvil 24, the die or ring 53 is engaged and moved downwardly from the position shown in Fig. 9 to that shown in Fig. 10. In this downward movement, the member or top anvil 24 engages the partially formed bloom 92 and forces it down over the active tapered portion of the punch or piercing member 31. No metal is removed in this operation and the bloom is pierced and further upset into accurate form and tight engagement with the die or ring 53. Since this die or ring is floating in its carrier and is yieldingly held in central position by the spring-pressed pins 56, such lateral yielding as may be necessary is permitted.

At the end of the downward movement of the top anvil or member 24, the bottom of the bloof is pressed against the base of the punch or expander 31 and the top and bottom surfaces of the bloom are brought to accurate shape. It will be noted that the internal surface of the ring or die member 53 is somewhat rounded and that in the piercing and expanding just described, the bloom is securely positioned in the ring. When the press parts separate, the springs 47 on the posts 43 raise the carrier, lifting the bloom off the punch 31 and upon reciprocation of the carrier away from the expanding central station the bloom moves with the ring from the position shown in Fig. 11 to that shown in Fig. 12 where it is arranged in axial alignment with the piercing, reaming and sizing punch 81 and its female companion member 84.

Figure 12:
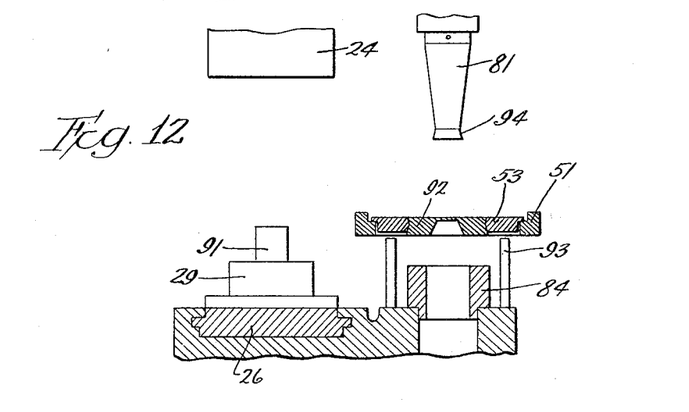

Pins 93 are arranged adjacent the female member 84 and in position to engage the carrier 51, as will be presently described, and as an incident to the removal of the bloom from the ring and its final piercing and sizing. Descent of the press head after the parts have been positioned, as shown in Fig. 12, causes the punch 81 to move down into engagement with the upper presented face of the tightly held bloom, so that further movement of this punch moves the carrier down against the springs 47 on the rods 43 and until it is engaged by the pins 93; the punch 81 moving on down first strips the bloom out of the ring 53 and onto the female support 84. Continued downward movement of the punch causes its sharpened edge 94 to pass through the bloom completing the piercing and sizing the opening this punch being given the long taper indicated at 95.

Upon the next upward reciprocation of the press head, the bloom which is now finished engages the ring 53 and is stripped from the punch 81 for removal from the apparatus.

Figure 13:
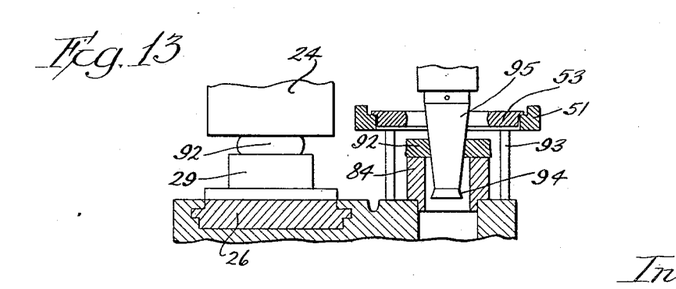

The next succeeding block 91 to be formed into a bloom may be positioned on the anvil 29 as soon as the slide 31 and carrier 51 have left their conjoint operative positions so that coincident with the final piercing and sizing of the bloom, as illustrated in Figs. 12 and 13, a second initial upsetting operation may be accomplished.

The slide 26 is limited in its movement in each direction by depressed ends 25' of the side guides 25 (see Fig. 1) and in like manner movement of the carrier 51 in each direction is limited by engagement with the frame parts 44 in which the shafts 45 are arranged. Positive stops are thus provided to insure accurate registration of the several upsetting and punching instrumentalities with the work in the several steps of the process.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The process of producing blooms to be employed in the manufacture of annular objects, which comprises upsetting a metal block to slightly less than the diameter of a sizing ring, arranging said upset block in said sizing ring, inserting a punch in said block while in said sizing ring to pierce it and expand it into engagement with said ring, the while holding said ring loosely to permit lateral movement of said ring and block.

2. The process of producing blooms to be employed in the manufacture of annular objects, which comprises upsetting a metal block to slightly less than the diameter of a sizing ring, arranging said upset block in said sizing ring, inserting a punch in said block while in said sizing ring to pierce it and expand it into engagement with said ring, and thereafter punching and sizing the opening through said block.

3. The process of producing blooms to be employed in the manufacture of annular objects, which comprises upsetting a metal block to slightly less than the diameter of a sizing ring, arranging said upset block in said sizing ring, inserting a punch in said block while in said sizing ring to pierce it and expand it into engagement with said ring, removing said block from said ring and therafter reaming and sizing the aperture produced in the piercing.

4. An apparatus for preparing blooms to be rolled into annular metal objects, comprising in combination, a piercing punch, a sizing die arranged concentrically with said punch and adapted to receive the metal to be formed into a bloom, a member co-operating with said punch for forcing said punch into said metal to pierce it and expand it laterally into sized relation with said die, and a carrier for said die, said carrier having yielding connection to said die, and said yielding connection permitting lateral bodily movement of said die in said piercing and expanding operation.

5. An apparatus for preparing blooms to be rolled into annular metal objects, comprising in combination, a piercing punch, a sizing die arranged concentrically with said punch and adapted to receive the metal to be formed into a bloom, a member co-operating with said punch for forcing said punch into said metal to pierce it and expand it laterally into sized relation with said die, and a carrier for said die, said carrier having yielding connection to said die, and said yielding connection permitting limited lateral bodily movement of said die in said piercing and expandng operation.

6. An apparatus for preparing blooms to be rolled into annular metal objects, comprising in combination, a piercing punch, a sizing die arranged concentrically with said punch and adapted to loosely receive the metal to be formed into a bloom, and a member co-operating with said punch for forcing said punch into said metal to pierce it and expand it laterally into sized relation with said die, said member and said punch co-operating to determine the thickness of said bloom throughout its area.

7. An apparatus for preparing blooms to be rolled into annular metal objects, comprising in combination, a sizing die adapted to receive the metal to be formed into said bloom, means upsetting the metal while in said die and into tight engagement with its presented face, piercing means adapted to engage the metal in said die after said upsetting operation, and means stripping said metal from said die as an incident to operation of said piercing member.

8. An apparatus for preparing blooms to be rolled into annular metal objects, comprising in combination, a sizing die adapted to receive the metal to be formed into a bloom, means upsetting said metal into tight engagement with said die, a carrier for said die, a piercing punch, and means comprising members engaging said carrier under the pressure of said piercing punch to permit said punch to strip said metal from said die as an incident to the piercing operation.

9. An apparatus for preparing blooms to be rolled into annular metal objects, comprising in combination, a sizing die adapted to receive the metal to be formed into a bloom, means upsetting said metal into tight engagement with the sides of said die, a male and female reaming and sizing punch organization, means moving said die into registration with said punch organization, and means moving a member of said punch organization to first strip said metal from said die and then to punch, ream and size the same by movement of the male member of said organization through the metal and into the female member.

10. An apparatus for preparing blooms to be rolled into annular metal objects, comprising a press having parts adapted to upset a block of metal into general bloom form, a sizing and piercing mechanism mounted in said press and movable into position between its upsetting parts, said mechanism comprising a sizing ring and a piercing and expanding member adapted to preliminarily sustain the bloom within the die and on the piercing and expanding member.

11. An apparatus for preparing blooms to be rolled into annular metal objects, comprising a press having parts adapted to upset a block of metal into general bloom form, a sizing and piercing mechanism mounted in said press and movable into position between its upsetting parts, said mechanism comprising a sizing ring and a piercing and expanding member adapted to preliminarily sustain the bloom within the die and on the piercing and expanding member, and means carried by and movable with a movable press part for stripping said bloom from said die when said die is out of registration with the upsetting parts of said press.

12. An apparatus for preparing blooms to be rolled into annular metal objects, comprising a press having parts adapted to upset a block of metal into general bloom form, a sizing and piercing mechanism mounted in said press and movable into position between its upsetting parts, said mechanism comprising a sizing ring and a piercing and expanding member adapted to preliminarily sustain the bloom within the die and on the piercing and expanding member, and means carried by and movable with a moving press part for piercing said bloom and sizing the opening after said bloom has been moved from upsetting position in said press.

13. An apparatus for preparing blooms to be rolled into annular metal objects, comprising in combination a sizing die into which the metal is upset, a piercing member for engaging the metal upset in said sizing die for piercing, said sizing die serving to strip the block from said piercing member after piercing.

14. An apparatus for preparing blooms to be rolled into annular metal objects, comprising a movable press head, a slide movable under said press head and carrying an anvil, a piercing die, slideways providing stops for limiting movement of said slide in each direction, and fluid pressure means for moving said slide beneath said press head.

15. An apparatus for preparing blooms to be rolled into annular objects, comprising in combination a plurality of sets of punching instrumentalities arranged side by side, a slide carrier for conveying the metal from one punching station to the other, means limiting the movement of said slide carrier in each direction, and fluid pressure means for moving said slide carrier.

16. The process of producing blooms to be employed in the manufacture of annular objects, which comprises performing the upsetting operation upon the bloom and within a sizing die to effect a forming operation upon the bloom and to bring it into holding contact with the die, employing the die to carry the bloom, the while moving the die to a second operating station and performing a second forming operation on the bloom at said second station.

17. An apparatus for preparing blooms to be rolled into annular metal objects, comprising in combination a sizing die, forging instrumentalities for engaging a bloom arranged in said sizing die to perform a forming operation and expand the bloom into engagement with the die, other forming mechanism arranged at a side of the first mentioned forming mechanism, and means moving the die with the bloom carried in it to said second mentioned forming mechanism.

BYRON W. DUNHAM.